US009913117B2

(12) United States Patent
Park et al.

(10) Patent No.: US 9,913,117 B2
(45) Date of Patent: Mar. 6, 2018

(54) ELECTRONIC DEVICE AND METHOD FOR EXCHANGING INFORMATION USING THE SAME

(71) Applicant: Samsung Electronics Co., Ltd., Gyeonggi-do (KR)

(72) Inventors: Ken-Hyung Park, Gyeonggi-do (KR); Kyung-Hee Lee, Gyeonggi-do (KR); Chi-Hyun Cho, Gyeonggi-do (KR); Chang-Ryong Heo, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 150 days.

(21) Appl. No.: 14/202,619

(22) Filed: Mar. 10, 2014

(65) Prior Publication Data

US 2015/0006670 A1 Jan. 1, 2015

(30) Foreign Application Priority Data

Jun. 27, 2013 (KR) ........................ 10-2013-0074368

(51) Int. Cl.
*G06F 15/16* (2006.01)
*H04W 4/18* (2009.01)
*G06F 3/01* (2006.01)

(52) U.S. Cl.
CPC ............ *H04W 4/185* (2013.01); *G06F 3/011* (2013.01)

(58) Field of Classification Search
CPC ........ H04L 67/06; H04L 29/08; H04W 4/185; G06F 3/011
See application file for complete search history.

(56) References Cited

U.S. PATENT DOCUMENTS

| | | | |
|---|---|---|---|
| 8,428,654 B2* | 4/2013 | Oh | H04M 1/72583 455/414.1 |
| 9,118,804 B2* | 8/2015 | Kim | H04L 65/1069 |
| 2002/0128030 A1 | 9/2002 | Eiden et al. | |
| 2004/0152440 A1* | 8/2004 | Yoda | H04L 12/2801 455/403 |
| 2008/0259043 A1 | 10/2008 | Buil et al. | |
| 2011/0175879 A1* | 7/2011 | Tanaka | H04B 13/005 345/211 |
| 2012/0023169 A1 | 1/2012 | Kang et al. | |
| 2012/0133605 A1 | 5/2012 | Tanaka | |
| 2012/0229425 A1* | 9/2012 | Barrus | G06F 3/04883 345/179 |
| 2012/0231840 A1* | 9/2012 | Calman | G06K 9/00342 455/556.1 |
| 2012/0315856 A1 | 12/2012 | Ko et al. | |
| 2013/0044912 A1* | 2/2013 | Kulkarni | G06K 9/00671 382/103 |
| 2013/0049926 A1* | 2/2013 | Hull | G06K 19/0716 340/3.1 |
| 2013/0141551 A1* | 6/2013 | Kim | H04N 5/445 348/51 |
| 2013/0148891 A1* | 6/2013 | Yassin | G06Q 10/00 382/190 |

* cited by examiner

*Primary Examiner* — Cheikh Ndiaye
(74) *Attorney, Agent, or Firm* — The Farrell Law Firm, P.C.

(57) ABSTRACT

A method and an apparatus are provided for exchanging information is an electronic device. Object data is received at an input unit. Object information associated with the object data is received at a communication unit via contact between a first medium and a second medium. The first medium directly contacts the electronic device. The object data is associated with the object information.

20 Claims, 8 Drawing Sheets

| | OBJECT DATA | OBJECT INFORMATION |
|---|---|---|
| a — 1 |  | - NAME : DAVID, SECTION CHIEF<br>- COMPANY : OOCOMPANY<br>- TEAM : R&D GROUP<br>- DAVID, SECTION CHIEF : OOO-XXXX-YYYY |
| 2 |  | - NAME : JOHN, MANAGER<br>- COMPANY : XXCOMPANY<br>- TEAM : MARKETING TEAM<br>- DAVID, SECTION CHIEF : OOO-YYYY-XXXX |
| c — 3 |  | - COLD MEDICINE<br>- DOSAGE : 3 TIMES A DAY,<br>            30 MINUTES AFTER A MEAL |
| ⋮ | ⋮ | ⋮ |

ELECTRONIC DEVICE AND METHOD FOR EXCHANGING INFORMATION USING THE SAME

PRIORITY

This application claims priority under 35 U.S.C. § 119(a) to a Korean Patent Application filed in the Korean Intellectual Property Office on Jun. 27, 2013 and assigned Serial No. 10-2013-0074368, the entire disclosure of which is incorporated herein by reference.

BACKGROUND OF THE INVENTION

1. Field of the Invention

Embodiments of the present invention relate generally to an electronic device and a method for exchanging information using the electronic device, and more particularly, to an electronic device capable of easily exchanging information and a method for exchanging information using the electronic device.

2. Description of the Related Art

The exchange of information between devices is achieved through wired/wireless communication. Simple data as well as mass data such as, for example, video and image data, may be exchanged between the devices. Due to developments in data exchange technology, users may easily exchange information with each other using their own devices. Typically, the devices may exchange information with each other using wireless communication technology such as, for example, Wireless Fidelity (Wi-Fi) and Bluetooth (BT).

SUMMARY OF THE INVENTION

The present invention has been made to address at least the above-mentioned problems and/or disadvantages and to provide at least the advantages described below. Accordingly, an aspect of the present invention provides an electronic device capable of easily exchanging information and a method for exchanging information using the electronic device.

In accordance with an aspect of the present invention, an electronic device is provided, which includes an input unit for receiving object data. The electronic device also includes a communication unit for receiving object information associated with the object data. The first medium directly contacts the electronic device. The electronic device further includes a controller configured to associate the object data with the object information.

In accordance with another aspect of the present invention, a method is provided for exchanging information in an electronic device. Object data is obtained at an input unit. Object information associated with the object data is received at a communication unit. The first medium directly contacts the electronic device. The object data is associated with the object information.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
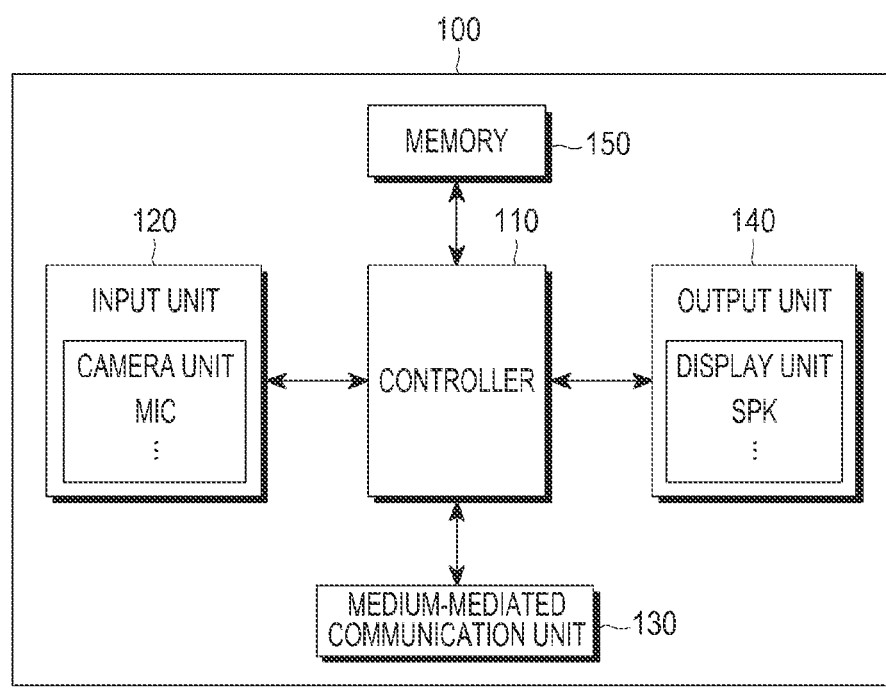
FIG. 1 is a diagram illustrating a structure of an electronic device, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The terms and words used in the following description and claims are not limited to their dictionary meanings, but, are used to enable a clear and consistent understanding of the invention.

It is to be understood that the singular forms "a," "an," and "the" include plural referents unless the context clearly dictates otherwise. Thus, for example, reference to "a component surface" includes reference to one or more of such surfaces.

Electronic devices, to which various embodiments of the present invention are applicable, may include, for example, wearable devices, mobile terminals, fixed terminals or the like. The wearable devices may include any device that a user can wear, such as, for example, glasses, watches, ear-microphones or the like, and may be equipped with communication features. The mobile terminals, or easy-to-carry mobile electronic devices, may include, for example, video phones, cellular phones, smart phones, Wideband Code Division Multiple Access (WCDMA) terminals, Universal Mobile Telecommunication Service (UMTS) terminals, Personal Digital Assistants (PDAs), Portable Multimedia Players (PMPs), Digital Multimedia Broadcasting (DMB) terminals, e-Book readers, portable computers (for example, laptop computers, tablet computers and the like), digital cameras, or the like. The fixed terminals may include, for example, desktop Personal Computers (PCs).

The term 'object data', as used herein, may refer to the data that is received via an input unit such as, for example, a camera unit and a microphone. For example, the object data may include image data, which is received via the camera unit and by which the user may recognize the appearances of objects such as people, animals or the like. In another example, the object data may include audio data, which is received via the microphone and by which the user may recognize the sounds generated from objects such as people, animals or the like. The object data is not limited to the data, which is received via the camera unit or the microphone, and may include the data, which is received from various sources such as, for example, the Internet.

The term 'object information', as used herein, may refer to information associated with the object data. For example, if the object data is image data representing a specific person's face, the object information may include information (for example, name, phone number, company or the like) about the specific person corresponding to the image data. In another example, if the object data is audio data representing a specific person's voice, the object information may include information (for example, name, phone number, company or the like) about the specific person corresponding to the audio data. In a further example, if the object data is sensing data such as tactile data, olfactory data, motion data or the like associated with a specific object, the object information may include information (for example, description information of touch, smell, motion or the like) about the specific object corresponding to the sensing data.

Examples of the object data and the object information will be described in greater detail below with reference to FIG. 2.

FIG. 1 illustrates a structure of an electronic device, according to an embodiment of the present invention. FIG. 2 illustrates object data and object information stored in a memory of an electronic device, according to an embodiment of the present invention.

Referring to FIG. 1, an electronic device 100 includes a controller 110, an input unit 120, a medium-mediated communication unit (or a human-mediated communication unit) 130, an output unit 140, and a memory 150.

The controller 110 controls the overall operation of the electronic device 100.

In accordance with an embodiment of the present invention, upon receiving object data via the input unit 120, the controller 110 stores the object data and its associated object information, received via the medium-mediated communication unit 130, in the memory 150.

Upon receiving object data via the input unit 120, the controller 110 may determine whether object information associated with the object data is stored in the memory 150. If no object information associated with the object data is stored in the memory 150, the controller 110 may store the object data and its associated object information, received via the medium-mediated communication unit 130, in the memory 150.

The controller 110 may provide the object data and the object information via the output unit 140.

If object information associated with the object data is stored in the memory 150, the controller 110 obtains the object information associated with the object data from the memory 150. The controller 110 then provides at least one of the object data received via the input unit 120 and the object information obtained from the memory 150 to a user via the output unit 140.

If an add request for object information occurs while providing the object data and/or the object information via the output unit 140, the controller 110 accesses a server and requests information about the object data. Upon receiving information about the object data from the server, the controller 110 stores the received information as additional object information for the object data, and outputs the stored additional object information.

If there is object information to transmit via the medium-mediated communication unit 130, the controller 110 transmits the object information to another electronic device that is connected to the electronic device 100 via the medium-mediated communication unit 130.

The input unit 120, a component capable of receiving object data, may be embodied as, for example, a camera unit, a microphone (MIC), or the like. The input unit 120 may also be embodied as, for example, a key input unit, a connector, or the like. The camera unit may be embodied as a camera sensor for capturing image data and converting the captured optical image signal into electrical image signal, and/or a signal processor for converting the analog image signal captured by the camera sensor into digital image data. The camera sensor may be, for example, a Charge-Coupled Device (CCD) sensor or a Complementary Metal-Oxide Semiconductor (CMOS) sensor. The signal processor may be implemented with, for example, a Digital Signal Processor (DSP). The camera sensor and the signal processor may be integrally or separately implemented.

The microphone may be embodied as a directional microphone, which is configured to receive (or pick up) audio data incoming from a specific direction.

The medium-mediated communication unit 130, a component capable of transmitting and receiving a signal via a medium, may be embodied as, for example, a human-mediated communication unit capable of transmitting and receiving data through contact with the human body. The medium-mediated communication unit 130 may also be embodied as a short-range wireless communication unit such as, for example, Wireless Fidelity (Wi-Fi), Bluetooth (BT), Infrared (IR) or the like.

The output unit 140, a component for outputting data, may be embodied as, for example, a display unit, a speaker, or the like. The output unit 140 may also be embodied as, for example, an earphone jack, a vibration motor, or the like.

The display unit may display, on its screen, the image signal received via the camera unit in the input unit 120 and the data output from the controller 110. For example, a Liquid Crystal Display (LCD) may be used as the display unit. In this embodiment, the display unit includes an LCD controller, a memory capable of storing image data, an LCD panel, or the like. If implemented as a touch screen, the display unit (for example, LCD) may serve as an input unit, and may display at least one key.

If the display unit is used as, for example, a touch screen unit, the touch screen unit may include a Touch Screen Panel (TSP) including a plurality of sensor panels. The plurality of sensor panels may include, for example, a capacitive sensor panel capable of detecting coarse touches made by the user's hand (or fingertip) and an Electro Magnetic Resonance (EMR) sensor panel capable of detecting fine touches made by the stylus pen. A transparent display may be used for the display unit.

The memory 150 may be embodied as, for example, a program memory, a data memory, and the like. The program memory stores control programs for controlling the overall operation of the electronic device 100, and/or programs capable of storing object data received via the input unit 120 and its associated object information received via the medium-mediated communication unit 130. The data memory temporarily stores the data generated during execution of the programs.

The memory 150 stores at least one piece of object data and/or at least one piece of object information associated with the at least one piece of object data. The object data may include, for example, image data, audio data, tactile data, olfactory data, and/or motion data.

Figure 2:
FIG. 2 is a diagram illustrating object data and object information stored in a memory of an electronic device, according to an embodiment of the present invention.
Figure 2:
Figure 2:

FIG. 2 is a diagram illustrating an example of object data and object information stored in the memory 150 of the electronic device 100, according to an embodiment of the present invention. As illustrated in FIG. 2, at least one piece of image data is stored as object data 210, and at least one piece of object information 220 associated with the at least one piece of image data is stored.

The object data 210 may be image data, which is received via the camera unit in the input unit 120. The object information 220, or information received via the medium-mediated communication unit 130, may be information associated with the object data 210 that is received via the input unit 120. For example, if a face of a specific person 'a' is recognized as the object data 210 through the camera unit, the object information 220 (for example, name, company, team, phone number, and the like) indicating the presence of the specific person 'a' may be received via the medium-mediated communication unit 130. The object information 220 may include additional object information for the object data 210. The additional object is received from the server.

If the electronic device 100 is connected to another electronic device via the medium-mediated communication unit 130, the object information 220 transmitted from the other electronic device may be stored in the memory 150 of the electronic device 100.

In accordance with an embodiment of the present invention, the electronic device 100 includes not only the controller 110, the input unit 120, the medium-mediated communication unit 130, the output unit 140, and the memory 150 illustrated in FIG. 1, but also, for example, an Radio Frequency (RF) unit for performing call functions, a multimedia module for broadcasting, communication, audio playback and/or video playback, a sensor module, a Global Positioning System (GPS) module, or the like.

In the electronic device 100 illustrated in FIG. 1, upon receiving image data, via the camera unit in the input unit 120, as the object data 210, the controller 110 determines whether object information associated with the image data exists in the memory 150. If there is no object information associated with the image data in the memory 150, the controller 110 stores the image data and its associated object information received via the medium-mediated communication unit 130, in the memory 150, and outputs the stored image data and object information on the display unit in the output unit 140.

Upon receiving audio data, via the microphone in the input unit 120, as the object data 210, the controller 110 determines whether object information associated with the audio data exists in the memory 150. If there is no object information 220 associated with the audio data in the memory 150, the controller 110 stores the audio data and its associated object information received via the medium-mediated communication unit 130, in the memory 150, and outputs the stored audio data and object information 220 on the display unit and/or through the speaker in the output unit 140.

FIGS. 3 to 8 are diagrams illustrating information exchange operations that can be performed in the electronic device, according to various embodiments of the present invention.

Figure 3:
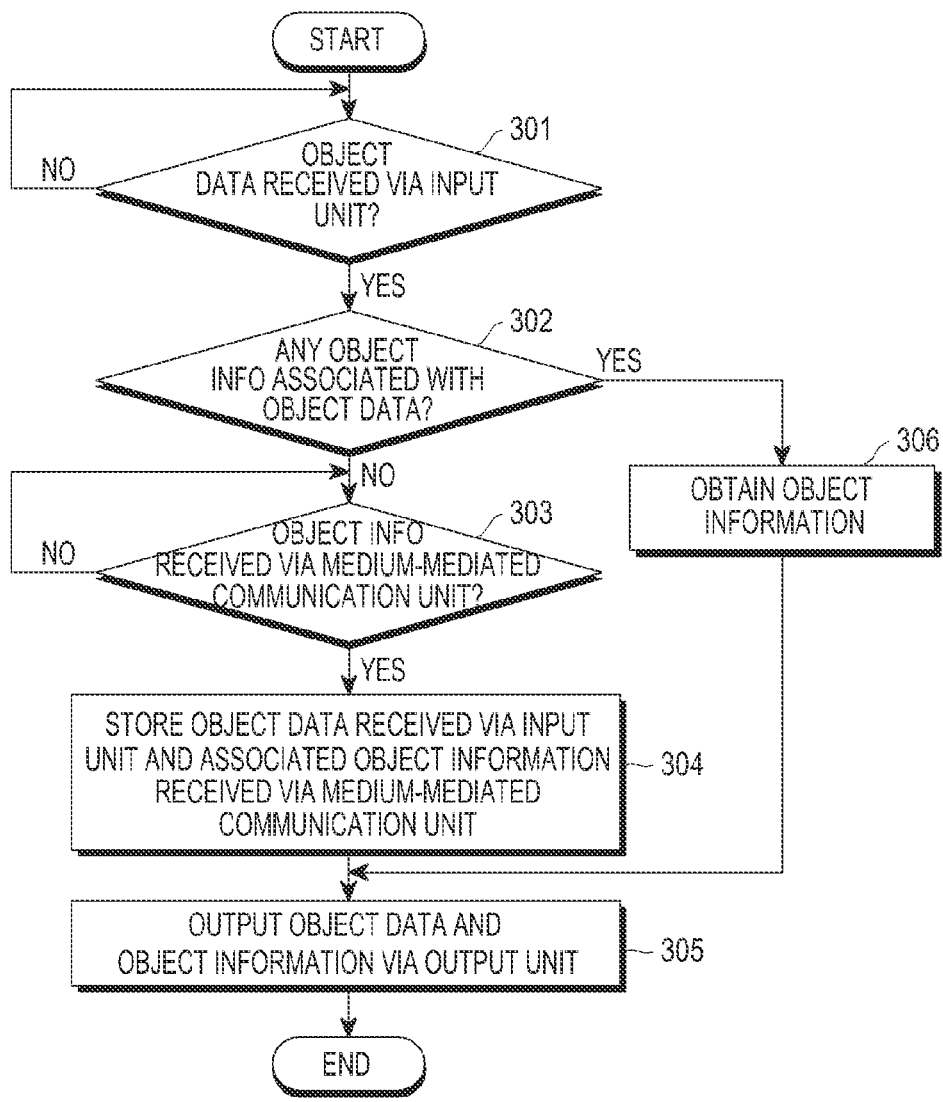
FIG. 3 is a flowchart illustrating an operation of exchanging information in an electronic device, according to an embodiment of the present invention.

FIG. 3 is a flowchart illustrating an operation of exchanging information in an electronic device, according to an embodiment of the present invention.

This information exchange operation is described in detail below with reference to FIGS. 1 to 3.

Referring to FIG. 3, the controller 110 determines whether object data is received via the input unit 120 of the electronic device 100, in step 301. If it is determined that the object data is received, the controller 110 determines whether object information associated with the object data exists in the memory 150, in step 302. If it is determined that object data is not received via the input unit 120, the controller 110 waits for the object data to be received via the input unit 120.

If it is determined, in step 302, that there is no object information that matches or is associated with the object data received via the input unit 120 in the memory 150, the controller 110 determines whether there is object information received via the medium-mediated communication unit 130, in step 303.

Specifically, in step 303, the controller 110 may determine whether object information is received from another electronic device when its medium-mediated communication is connected through contact between an object having the electronic device 100 and an object having another electronic device, or through short-range wireless communication between the electronic device 100 and another electronic device. The object (for example, a user) having another electronic device may be a target of the object data that is received via the input unit 120 in step 301, or another electronic device may be a target of the object data that is received via the input unit 120 in step 301. For example, if another electronic device is glasses, an object (for example, a user) wearing the glasses may be a target of the object data received via the input unit 120, or the glasses may be a target of the object data.

If it is determined, in step 303, that object information is received via the medium-mediated communication unit 130, the controller 110 associates the object data received via the input unit 120 with the object information received via the medium-mediated communication unit 130. For example, if it is determined that object information is received a predetermined time before and/or after the time the object data is received, the controller 110 associates the object data with the object information. In step 304, the controller 110 stores the associated object data and object information in the memory 150.

If it is determined, in step 303, that there is no object information received via the medium-mediated communication unit 130, the controller 110 waits for the object information to be received via the medium-mediated communication unit 130. If no object information is received a predetermined time before and/or after the time the object data is received, the controller 110 recognizes the object data received via the input unit 120 as common data, and the object data is output through the output unit 140.

In step 305, the controller 110 outputs the object data and its associated object information stored in the memory 150 through the output unit 140. By performing step 305, the controller 110 provides information about the object having another electronic device or about another electronic device to the object (for example, user) having the electronic device 100. For example, if a first user wearing glasses as his/her own electronic device shakes hands with a second user wearing glasses as his/her own electronic device, information (for example, name, phone number and the like) about the second user and/or information (for example, eyewear brand, features and the like) about the glasses that the second user wears, may be displayed on the glasses that the first user wears.

If it is determined, in step 302, that there is object information that is matched or associated with the object data received via the input unit 120 and stored in the memory 150, the controller 110 obtains the object information associated with the object data received via the input unit 120 from the memory 150, in step 306.

Subsequently, in step 305, the controller 110 outputs the object data received via the input unit 120 and/or the object information obtained from the memory 150, through the output unit 140. The controller 110 outputs only one of the object data received via the input unit 120 and the object information obtained from the memory 150, through the output unit 140.

The electronic device 100 not only receives the object information from another electronic device to which its communication is connected via the medium-mediated communication unit 130, but also transmits the object information stored in its memory 150 to another electronic device.

Figure 4:
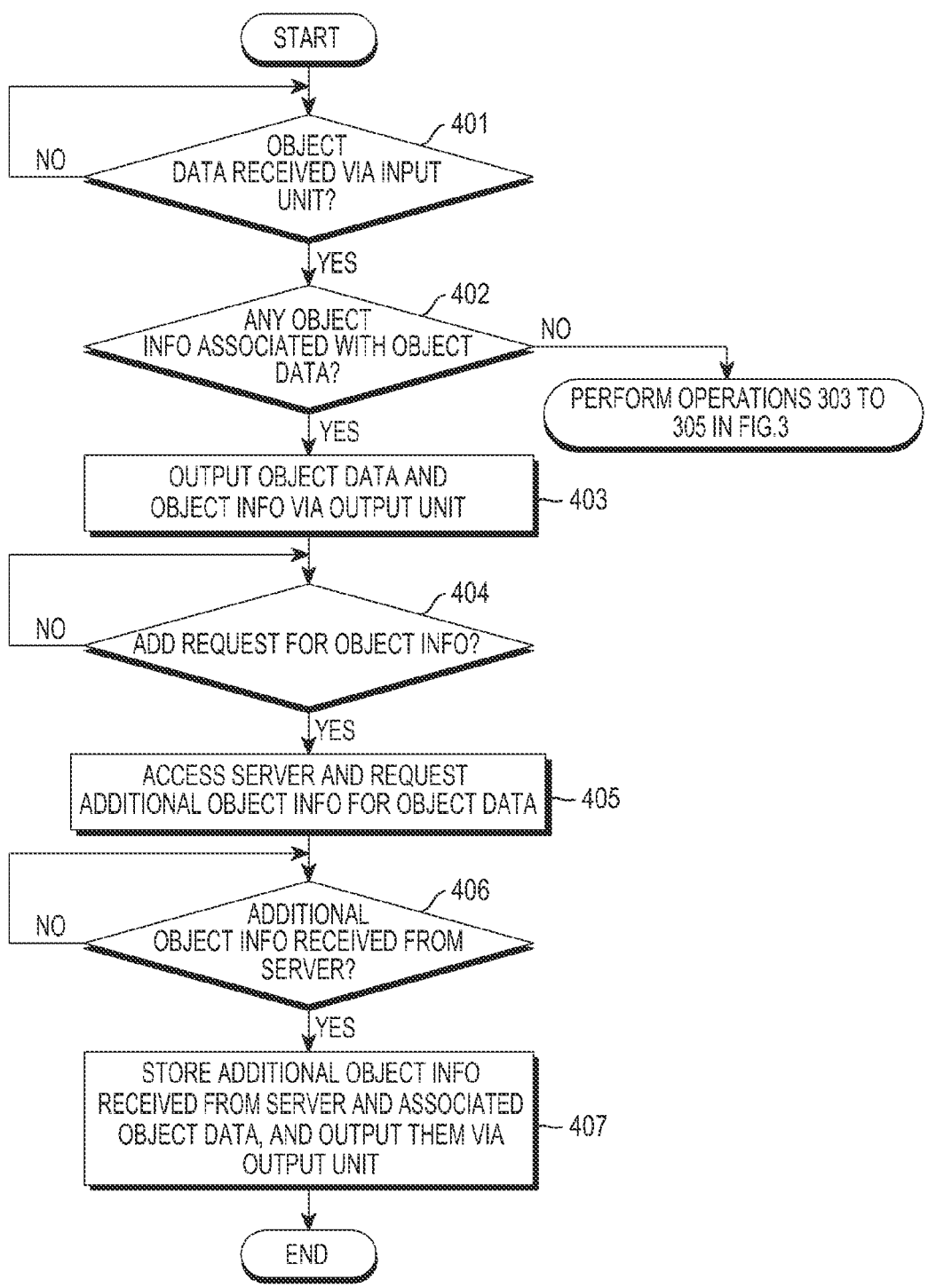
FIG. 4 is a flowchart illustrating an operation of requesting addition of object information in an electronic device, according to an embodiment of the present invention.

FIG. 4 is a flowchart illustrating an operation of requesting the addition of object information in an electronic device, according to an embodiment of the present invention.

This operation is described in detail below with reference to FIGS. 1 and 4.

Referring to FIG. 4, the controller 110 determines whether object data is received via the input unit 120 of the electronic device 100, in step 401. If it is determined that the object data is received, the controller 110 determines whether object information associated with the object data exists in the memory 150, in step 402. If it is determined that no object data is received, the controller 110 waits for the object data to be received via the input unit 120. If it is determined, in step 402, that there is no object information associated with the object data received via the input unit 120 in the memory 150, the controller 110 performs steps 303 to 305 in FIG. 3. If it is determined, in step 402, that object information associated with the object data received via the input unit 120 exists in the memory 150, the controller 110 obtains the object information associated with the object data received via the input unit 120, from the memory 150. In step 403, the controller 110 provides the object data received via the input unit 120 and/or the object information obtained from the memory 150, through the output unit 140. The controller 110 may output only one of the object data received via the input unit 120 and the object information obtained from the memory 150, through the output unit 140.

While providing the object data and the object information in step 403, the controller 110 determines whether there is a request for additional object information for the object data, in step 404. The request for additional object information for the object data may while the controller 110 provides the object data and the object information, and also after the controller 110 outputs the object data and the object information.

The request for additional object information for the object data may be made by, for example, a user's voice command and/or a touch input on the display unit. If it is determined, in step 404, that there is a request for additional object information for the object data, the controller 110 accesses the server and requests additional object information for the object data from the server, in step 405.

If it is determined, in step 404, that there is no request for additional object information for the object data, the controller 110 waits for a request for the additional object information for the object data.

Upon receiving the request for additional object information associated with the object data from the electronic device 100, the server may obtain object information associated with the object data from its Database (DB) and transmit the obtained object information to the electronic device 100.

The controller 110 determines whether the additional object information it requested in step 405 has been received, in step 406. If it is determined that the additional object information has been received from the server, the controller 110 stores the additional object information received from the server and its associated object data in the memory 150. In step 407, the controller 110 outputs the additional object information received from the server, together with the object data and/or its associated object information being output, in step 403. If it is determined, in step 406, that the additional object information has not been received from the server, the controller 110 may re-send the request for additional object information to the server or may inform the user of the failure to receive additional object information, after a lapse of a predetermined time.

For example, if a user wearing glasses as his/her own electronic device makes contact with a vial (or medicine bottle) that has tag information and can exchange the information, information (for example, type and dosage of the medicine) about the medicine contained in the vial may be displayed on the glasses. If additional object information for the medicine is requested by a user's voice command, while the information about the medicine is displayed on the glasses, the requested additional object information (for example, manufacturer and components of the medicine) for the medicine may be received from the server and additionally displayed on the glasses.

As a result, the user may recognize the object data and its associated object information through the output unit 140, and may request desired additional object information for the object data.

Figure 5:
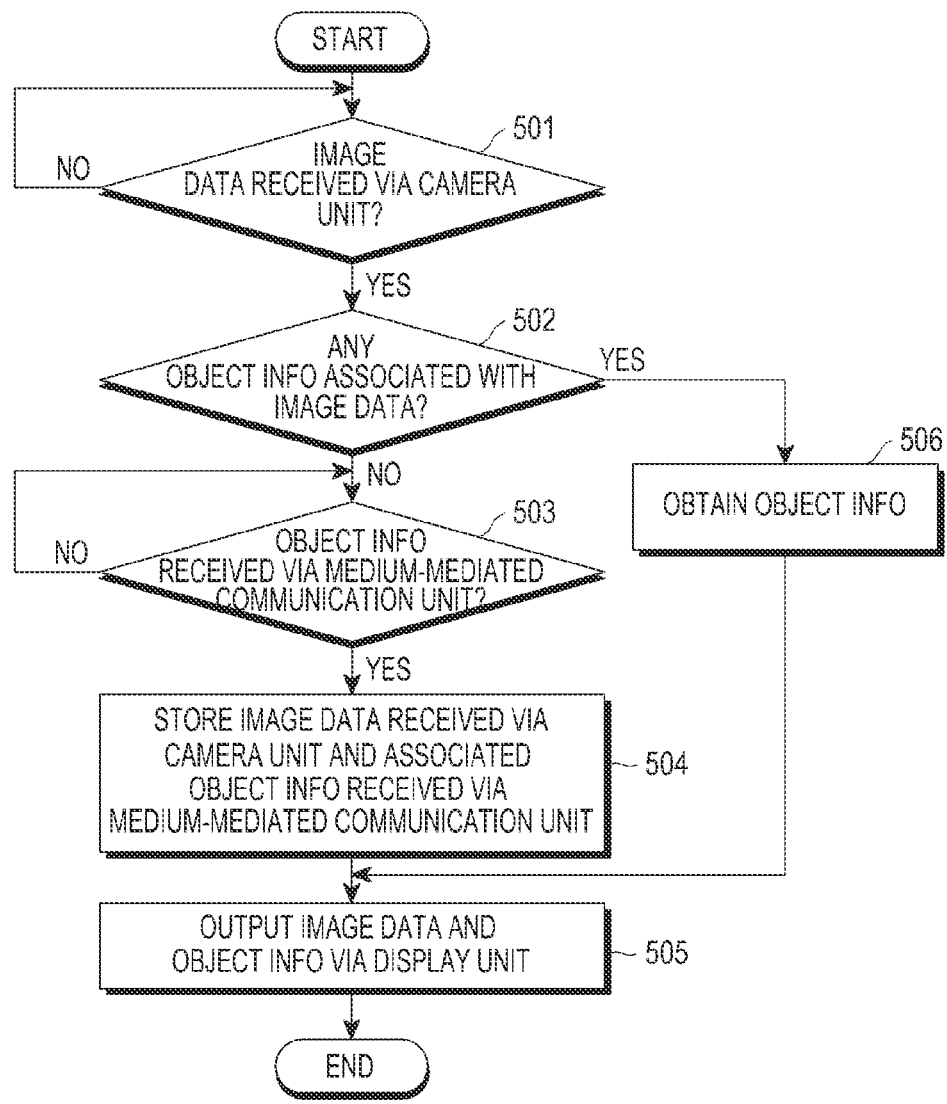
FIG. 5 is a flowchart illustrating an operation of exchanging information using a camera unit and a medium-mediated communication unit in an electronic device, according to an embodiment of the present invention.

FIG. 5 is a flowchart illustrating an operation of exchanging information using a camera unit and a medium-mediated communication unit in an electronic device, according to an embodiment of the present invention. In FIG. 5, it is assumed that the electronic device receives object data via the camera unit and object information via the human-mediated communication unit, and displays the object data and/or its associated object information on the display unit. However, the receiving means and the displaying means for the object data and/or the object information may not be limited to the camera unit, the human-mediated communication unit, and the display unit.

This operation will be described in detail below with reference to FIGS. 1 and 5.

Referring to FIG. 5, the controller 110 determines whether image data is received, via the camera unit of the electronic device 100, as object data, in step 501. If it is determined that the image data is received, the controller 110 determines whether object information associated with the image data received via the camera unit exists in the memory 150, in step 502. If it is determined that no image data is received, the controller 110 waits for the image data to be received via the camera unit.

If it is determined, in step 502, that there is no object information associated with the object data (or image data) received via the camera unit in the memory 150, the controller 110 determines whether there is object information received via the human-mediated communication unit 130, in step 503.

If it is determined, in step 503, that there is object information received via the human-mediated communication unit 130, the controller 110 associates the object data received via the camera unit with the object information received via the human-mediated communication unit 130. In step 504, the controller 110 stores the associated object data and object information in the memory 150. If it is determined, in step 503, that there is no object information received via the human-mediated communication unit 130, the controller 110 waits for the object information to be received via the human-mediated communication unit 130. If the object information is not received a predetermined time before and/or after the time the image data is received, the controller 110 recognizes that the image data received via the camera unit is common image data, and display the image data on the display unit.

In step 505, the controller 110 displays the object data and its associated object information stored in the memory 150, on the display unit. By performing step 505, the controller 110 provides information about the object having another electronic device or about another electronic device to the object (for example, user) having the electronic device 100.

If it is determined, in step 502, that object information associated with the object data received via the camera unit exists in the memory 150, the controller 110 obtains the object information matched or associated with the image data from the memory 150, in step 506.

Subsequently, in step 505, the controller 110 displays, on the display unit, the image data received via the camera unit and the object information obtained from the memory 150.

The electronic device 100 may not only receive the object information from another electronic device to which its communication is connected via the human-mediated communication unit 130, but may also transmit the object information stored in its memory 150 to another electronic device.

The operation of FIG. 5 is described in greater detail below with reference to FIGS. 6 and 7.

Figure 6:
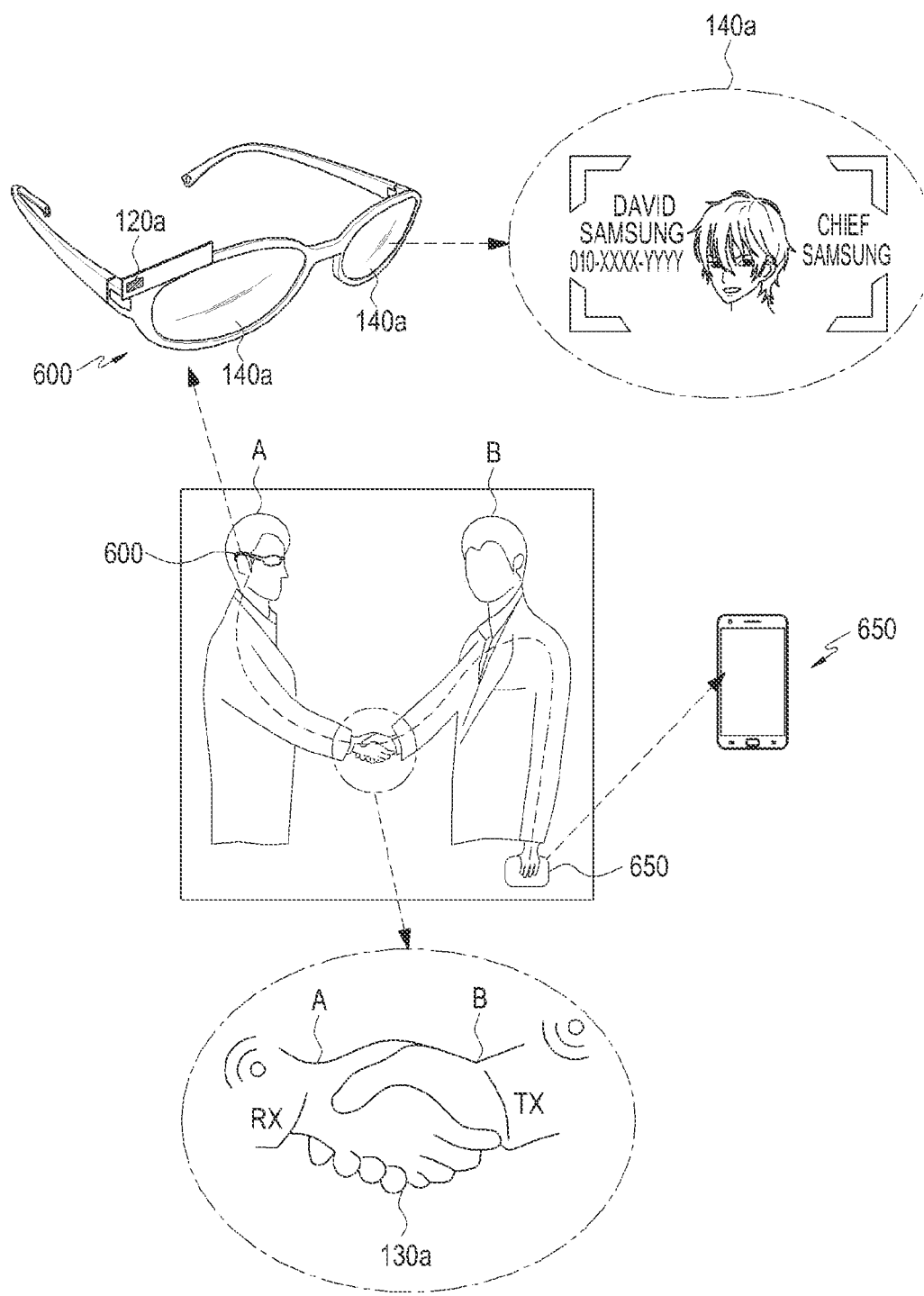
FIGS. 6 and 7 are diagrams illustrating an operation of exchanging information using a camera unit and a medium-mediated communication unit in an electronic device, according to an embodiment of the present invention.

FIG. 6 is a diagram illustrating an example of an information exchange operation between persons, according to an embodiment of the present invention. Referring to FIG. 6, a first user A wearing glasses 600 as his/her own information exchange device (or electronic device) may shake hands with a second user B having a user device 650 as his/her own information exchange device. A camera unit 120a (for example, the input unit 120) mounted in the glasses 600 of the first user A may capture a face of the second user B, to obtain face image data of the second user B as object data. The glasses 600 and the user device 650 may include the same components as those illustrated in FIG. 1.

A controller (for example, the controller 110) mounted in the glasses 600 of the first user A determines whether object information associated with the face image data of the second user B exists in a memory of the glasses 600.

If the object information associated with the face image data of the second user B exists in the memory, the controller may obtain the object information associated with the face image data of the second user B from the memory mounted in the glasses 600. The controller displays the image data (or object data) of the second user B and/or the object information associated with the image data of the second user B, on a display unit 140a (for example, the display unit 140) mounted in the glasses 600. As the controller obtains the object information and displays the obtained object information on the glasses 600, the first user A may get information about the second user B through the glasses 600 that he/she wears, by simply shaking hands with the second user B. The image data (or object data) of the second user B and/or the object information associated with the image data may be output through another electronic device that the first user A carries with him/her, or through other electronic devices.

If there is no object information associated with the face image data of the second user B in the memory of the glasses 600, the controller mounted in the glasses 600 may determine whether object information is received from the second user B via a human-mediated communication unit (for example, the medium-mediated communication unit 130). As the first user A makes physical contact with the second user B through a medium 103a such as handshaking, human-mediated communication may be connected. The human-mediated communication unit mounted in the glasses 600 of the first user A may receive object information of the second user B, which is stored in the user device 650 of the second user B, through the human-mediated communication.

Specifically, regarding the human-mediated communication unit, while the first user A shakes hands with the second user B, the object information output from the user device 650 that the second user B holds with his/her left hand, may be transmitted to the right hand of the second user B through the body of the second user B. The object information may be transmitted to the right hand of the first user A which shakes second user B's right hand, which serves as a transmitting unit TX. The object information received via the right hand of the first user A, which serves as a receiving unit RX, may be transferred to the glasses 600 that the first user A wears, through the body of the first user A.

The object information stored in the user device 650 of the second user B may be transmitted to the glasses 600 of the first user A through the second user B and the first user A by the human-mediated communication. Similarly, object information of the first user A may also be transmitted to the user device 650 of the second user B through the first user A and the second user B.

Upon receiving object information of the second user B via the human-mediated communication unit, the controller mounted in the glasses 600 may associate or match the object information received via the human-mediated communication unit with the face image data of the second user B. The controller then stores the associated face image data and object information of the second user B in the memory (for example, the memory 150) mounted in the glasses 600, as represented by 'a' in FIG. 2. Thus, as the controller mounted in the glasses 600 displays the image data (or object data) of the second user B and/or its associated object information on the display unit 140a mounted in the glasses 600, the first user A may also obtain object information of the second user B through his/her glasses 600 while shaking hands with the second user B.

In FIG. 6, it is assumed that the object data and/or its associated object information of the second user B are displayed on the glasses 600 of the first user A. However, the second user B may also receive object data of the first user A via a camera unit mounted in the user device 650, receive object information of the first user A via a human-mediated communication unit mounted in the user device 650, and display the received object data and object information on a display unit of the user device 650.

Figure 7:
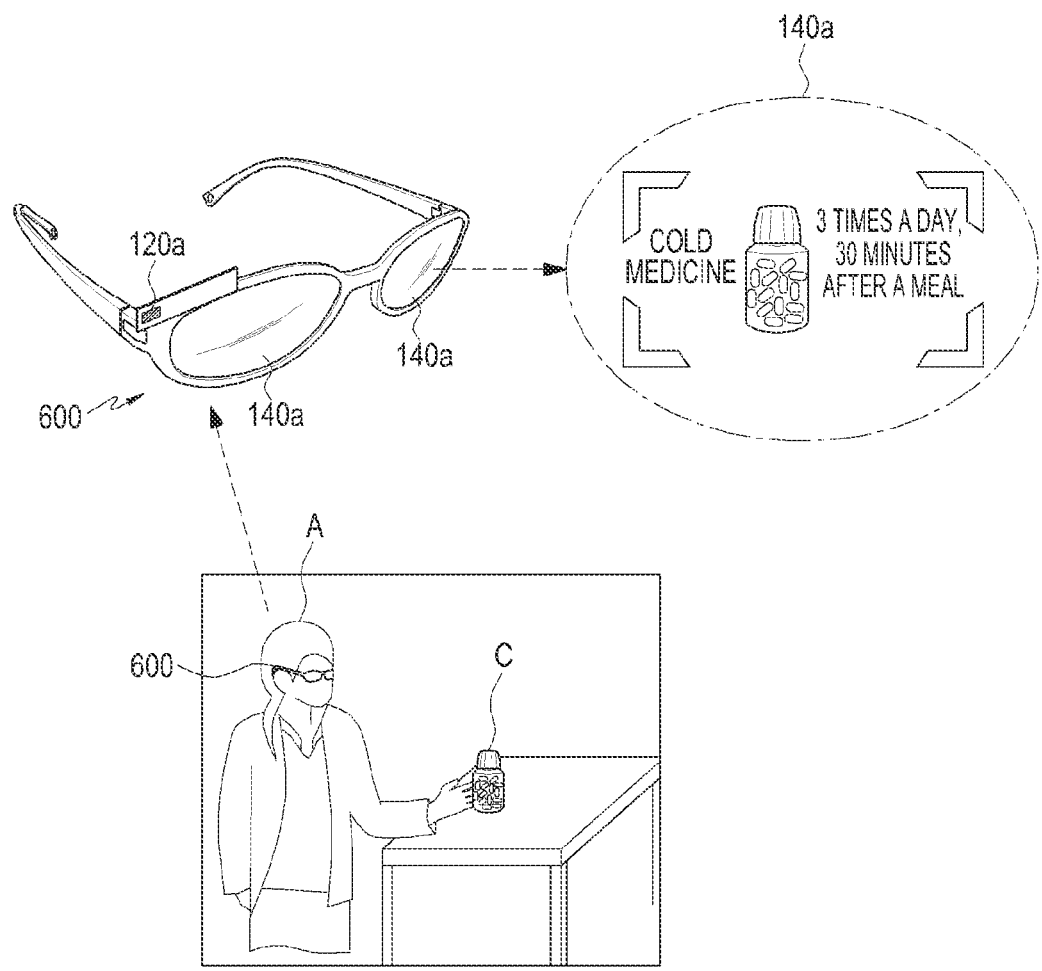

FIG. 7 is a diagram illustrating an example of an information exchange operation between a person and an object, according to an embodiment of the present invention. Referring to FIG. 7, a first user A wearing the glasses 600 as his/her own electronic device makes contact with a vial C having information that can be transmitted via a medium. The camera unit 120a mounted in the glasses 600 of the first user A obtains image data of the vial C as object data by capturing the vial C as the first user A looks at.

The controller mounted in the glasses 600 of the first user A determines whether object information associated with the image data of the vial C exists in a memory mounted in the glasses 600.

If object information associated with the image data of the vial C exists in the memory, the controller obtains the object information associated with the image data of the vial C from the memory, and displays the image data of the vial C and/or its associated object information on the display unit 140a mounted in the glasses 600. This makes it possible for the first user A to get the object information of the medicine contained in the vial C through the glasses 600 that he/she wears, by simply capturing an image of the vial C.

If there is no object information associated with the image data of the vial C in the memory, the controller mounted in the glasses 600 determines whether object information of the vial C is received via the human-mediated communication unit mounted in the glasses 600.

When the first user A makes contact with the vial C, human-mediated communication can be connected. Object information of the vial C may be transmitted to the glasses 600 of the first user A via the first user A, who is in contact with the vial C.

For example, a wireless communication tag or a medium-mediated communication module including object information of the vial C may be attached onto the outside of the vial C. Accordingly, when the first user A touches the wireless communication tag or the medium-mediated communication module of the vial C with his/her hand, the object information included in the wireless communication tag or the medium-mediated communication module is transmitted to the glasses 600 of the first user A through the hand of the first user A.

Upon receiving the object information of the vial C via the human-mediated communication unit, the controller mounted in the glasses 600 associates the object information received via the human-mediated communication unit with the image data of the vial C. The controller then stores the associated image data and object information of the vial C in the memory (for example, the memory 150), as represented by 'c' in FIG. 2. While the controller mounted in the glasses 600 displays the image data (or object data) and/or object information of the vial C on the display unit 140a mounted in the glasses 600, the first user A may obtain the information about the medicine contained in the vial C through the glasses 600 that he/she wears by making contact with the vial C.

Figure 8:
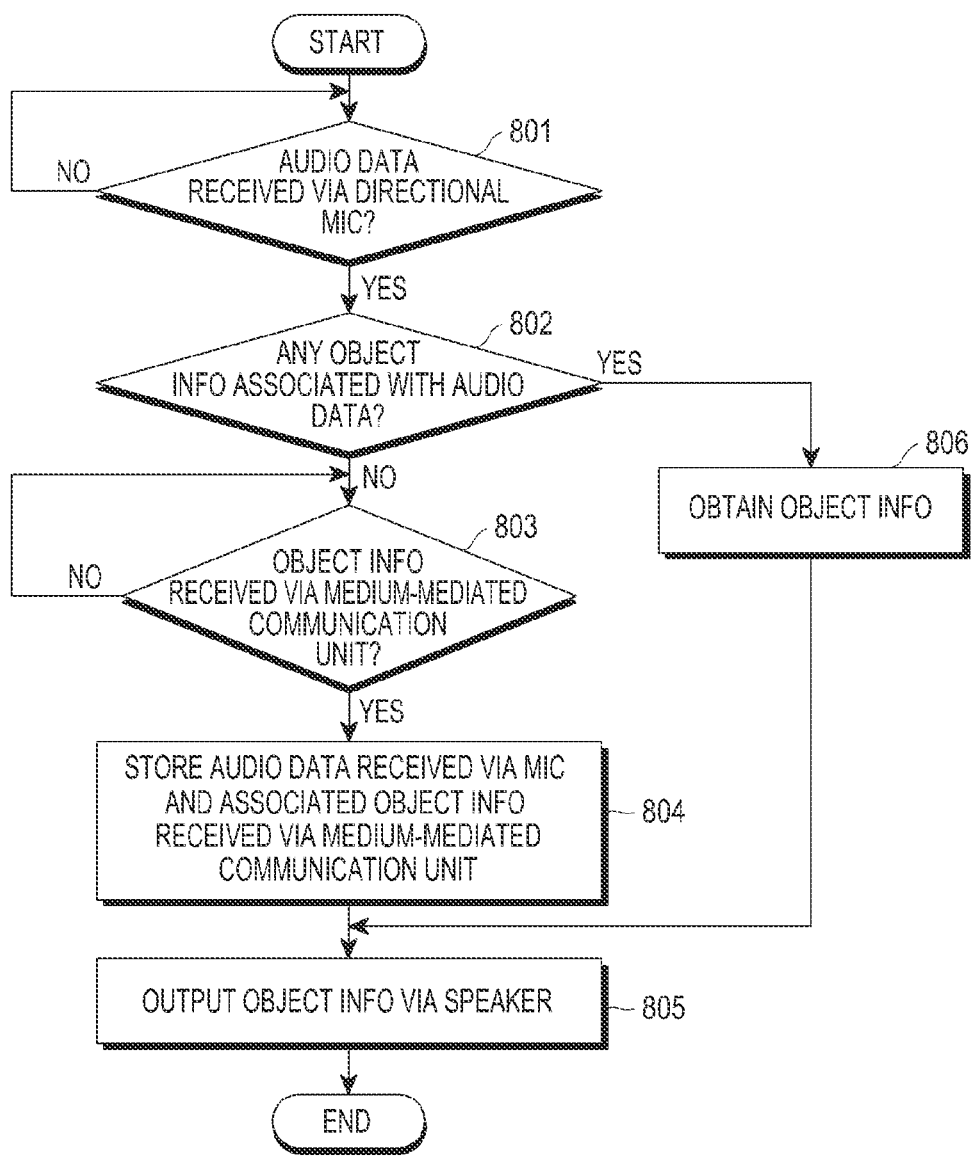
FIG. 8 is a flowchart illustrating an operation of exchanging information using a microphone and a medium-mediated communication unit in an electronic device, according to an embodiment of the present invention.

FIG. 8 is a flowchart illustrating an operation of exchanging information using a microphone and a medium-mediated communication unit in an electronic device, according to an embodiment of the present invention. In FIG. 8, it is assumed that the electronic device receives object data via a directional microphone and object information via a human-mediated communication unit, and that the electronic device outputs the object data and/or the object information through a speaker. However, the receiving means and the outputting means for the object data and/or the object information may not be limited to the directional microphone, the human-mediated communication unit, and the speaker.

This operation will be described in detail below with reference to FIGS. 1 and 8.

Referring to FIG. 8, the controller 110 determines whether audio data is received via the directional microphone of the information exchange device (or electronic device) 100 as object data, in step 801. If it is determined that the audio data is received, the controller 110 determines whether object information associated with the audio data received via the directional microphone exists in the memory 150, in step 802. If it is determined that no audio data is received as the object data, the controller 110 waits for the audio data to be received via the directional microphone.

If it is determined, in step 802, that no object information associated with the object data exists in the memory 150, the controller 110 determines whether there is object information received via the human-mediated communication unit 130, in step 803.

If it is determined, in step 803, that there is object information received via the human-mediated communication unit, the controller 110 associates the object information received with the human-mediated communication unit with the audio data received via the directional microphone. The controller stores the associated audio data and object information in the memory 150, in step 804. If it is determined, in step 803, that there is no object information received via the human-mediated communication unit, the controller 110 waits for the object information to be received via the human-mediated communication unit. If no object information is received a predetermined time before and/or after the time the audio data is received, the controller 110 recognizes the audio data received via the directional microphone as common audio data, and outputs the audio data through the speaker.

In step 805, the controller 110 outputs the audio data (or object data) and/or its associated object information stored in the memory 150 using the speaker, thereby providing object information of another information exchange device to the object (for example, user) of the information exchange device 100.

If it is determined, in step 802, that object information associated with the object data received via the directional microphone exists in the memory 150, the controller 110 obtains the object information associated with the audio data from the memory 150, in step 806.

Subsequently, in step 805, the controller 110 outputs the audio data received via the directional microphone and the object information obtained from the memory 150, using the speaker.

For example, if a first user wearing an electronic device including a microphone as his/her own information exchange device shakes hands with a second user wearing or having another information exchange device, the first user may receive a voice of the second user via the microphone as audio data (or object data). If object information associated with the audio data exists in a memory of the electronic device, the electronic device may output the object data and/or its associated object information in voice using its speaker, thereby allowing the first user to recognize the second user that he/she now faces. The electronic device may have a separate directional microphone.

However, there may not be any object information associated with the audio data in the memory of the electronic device. In this case, if object information is received from the second user through human-mediated communication that is connected as the first user shakes hands with the second user, the electronic device of the first user stores the received object information and its associated audio data in the memory 150. The electronic device outputs the object data and/or its associated object information in voice using its speaker, thereby allowing the first user to recognize the second user that he/she now faces.

The information exchange method, according to various embodiments of the present invention, may be implemented in a computer-readable recording medium as computer-readable codes. The computer-readable recording medium may include any kind of recording device storing computer-readable data. Typical examples of the recording medium may include, for example, Read Only Memory (ROM), Random Access Memory (RAM), optical disc, magnetic tape, floppy disc, hard disc, non-volatile memory and the like, and may also include a recording medium implemented in the form of carrier waves (for example, transmission over the Internet). The computer-readable recording medium may be distributed over computer systems connected by a network, so the computer-readable codes may be stored and executed in a distributed manner.

As is apparent from the foregoing description, the information exchange method, according to various embodiments of the present invention, may easily exchange information without additional entry by a user.

While the invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. A glasses device comprising:
   an camera unit configured to received object data;
   a communication unit configured to receive object information corresponding to the object data via direct contact between a first medium including a part of a human body and a second medium including another part of a human body; and
   a controller configured to:
   determine whether the object information associated with the object data received via the camera unit exists in the glasses device;
   determine whether the object information received via the communication unit exists, if the object information associated with the object data received via the camera unit does not exist in the glasses device;
   associate and store the object data received via the camera unit with the object information received via the communication unit, if the object information received via the communication unit exists;
   display the object data received via the camera unit and the object information received via the communication unit;
   determine whether the object data is received from the camera unit in a predetermined area if additional object information associated with the object data is requested through a voice command while displaying the object data and the object information; and
   receive and display the additional object information associated with the object data from a server if the object data is received from the camera unit in a predetermined area.

2. The glasses device of claim 1, wherein the communication unit is configured to perform communication via direct contact between a user of the glasses device and another user or an object.

3. The glasses device of claim 1, wherein the controller is configured to determine whether the glasses device comprises object information associated with the object data.

4. The glasses device of claim 1, wherein the controller is configured to store or output the object data and the object information.

5. The glasses device of claim 1, further comprising a memory for storing at least one of at least one piece of object data and at least one piece of object information associated with the at least one piece of object data.

6. The glasses device of claim 1, further comprising an output unit for outputting at least one of the object data and the object information.

7. The glasses device of claim 1, wherein, when the glasses device comprises object information associated with the object data, the controller is configured to obtain the object information.

8. The glasses device of claim 1, wherein the controller is configured to transmit at least some of the object information to an external electronic device that is connected to the glasses device via the communication unit.

9. The glasses device of claim 1, wherein, when an add request for additional object information occurs, the controller is configured to receive from the server the additional object information associated with the object data.

10. The glasses device of claim 9, wherein the controller is configured to associate the additional object information with the object data.

11. The glasses device of claim 1, upon receiving image data via the camera unit as the object data, the controller is configured to associate the image data with the object information.

12. The glasses device of claim 1, further comprising a microphone; and wherein upon obtaining audio data via the microphone as the object data, the controller is configured to associate the audio data with the object information.

13. A method of exchanging information in a glasses device, the method comprising:
   received object data via a camera unit mounted in the glasses device;
   determining whether object information associated with the object data received via the camera unit exists in the glasses device;
   determining whether the object information received via a communication unit exists, if the object information associated with the object data received via the camera unit does not exist in the glasses device;
   associating and store the object data received via the camera unit with the object information received via the communication unit, if the object information received via the communication unit exists;
   displaying the object data received via the camera unit and the object information received via the communication unit;
   determining whether the object data is received from the camera unit in a predetermined area if additional object information associated with the object data is requested through a voice command while displaying the object data and the object information; and
   receiving and displaying the additional object information associated with the object data from a server if the object data is received from the camera unit in a predetermined area.

14. The method of claim 13, further comprising:
   determining whether the glasses device comprises the object information associated with the object data.

15. The method of claim 13, further comprising outputting at least one of the object data and the object information.

16. The method of claim 14, further comprising:
   when the glasses device comprises the object information associated with the object data, obtaining the object information; and
   outputting the object information.

17. The method of claim 13, further comprising:
   transmitting at least some of the object information to an external electronic device that is connected to the glasses device via the communication unit.

18. The method of claim 13, further comprising:
upon receiving an add request for additional object information, receiving from the server the additional object information associated with the object data.

19. The method of claim 13, further comprising:
when image data is received via the camera unit as the object data, associating the image data with the object information.

20. The method of claim 13, further comprising:
when audio data is obtained via a microphone, associating the audio data with the object information.

* * * * *